United States Patent [19]

Miyata

[11] Patent Number: 4,982,379

[45] Date of Patent: Jan. 1, 1991

[54] SEMICONDUCTOR MEMORY DEVICE HAVING ASSOCIATIVE FUNCTION

[75] Inventor: Souichi Miyata, Nara, Japan

[73] Assignee: Sharp Kabushiki Kaisha, Osaka, Japan

[21] Appl. No.: 260,060

[22] Filed: Oct. 20, 1988

[30] Foreign Application Priority Data

Oct. 20, 1987 [JP] Japan .................................. 62-265732

[51] Int. Cl.$^5$ .............................................. G11C 7/00
[52] U.S. Cl. ........................... 365/189.07; 365/189.05; 365/230.08
[58] Field of Search ....................... 365/189.07, 189.05, 365/230.08

[56] References Cited

U.S. PATENT DOCUMENTS 4,811,294 3/1989 Kobayashi et al. ............. 365/189.07

FOREIGN PATENT DOCUMENTS 62-34253 2/1987 Japan .
62-34254 2/1987 Japan .
62-211749 9/1987 Japan .

OTHER PUBLICATIONS

Processings of 32nd National Conf. of Information Processing Society of Japan, 1986, "Memory Function in Data Flow Type Processor Q-P", pp. 221-222.
Electronic and Communication Society–Nov. 21, 1986; pp. 85–92, "Execution Control System of Data Driven Type Processor Q-P".
Technical Report of Institute of Electronic and Communication Engineers of Japan (1983), pp. 45–52.

*Primary Examiner*—James W. Moffitt

[57] ABSTRACT

A semiconductor memory device includes a memory cell array having a plurality of memory cells and first, second, third and fourth data transferring portions. Tag information, key information and operand data applied to the first data transferring portion are sequentially transferred to the second data transferring portion, the third data transferring portion and the fourth data transferring portion. Any of the memory cells in the memory cell array are selected based on the key information, so that new tag information and operand data are read out from the selected memory cells. The inputted tag information and the tag information read out from the memory cell array are compared with each other by the comparison determining portion. When the information coincides with each other, the inputted key information, the new tag information, the new operand data and the inputted operand data are outputted to the exterior. When the information does not coincide with each other, the inputted tag information and the inputted operand data are written into the memory cell array.

15 Claims, 3 Drawing Sheets

I : INPUT
DR : DECODING FOR READING
RD : READING OUT FROM MEMORY CELLS
C : COMPARISON DETERMINATION
O : OUTPUT
DW : DECODING FOR WRITING
WT : WRITING INTO MEMORY CELLS

SEMICONDUCTOR MEMORY DEVICE HAVING ASSOCIATIVE FUNCTION

BACKGROUND OF THE INVENTION

1. Field of the Invention

The present invention relates generally to semiconductor memory devices, and more particularly, to a semiconductor memory device having an associative function which can be used for retrieving information based on an input of a keyword and an operand data pair producing mechanism in a data flow computer.

2. Description of the Related Art

Conventionally, as a semiconductor memory device having an associative function has been known as disclosed in, for example, Technical Report of Institute of Electronic and Communication Engineers of Japan, (1983) SSD83-78, pp. 45-52. The semiconductor memory device is a so-called logic-in memory including a plurality of memory cells where each cell has a collating and comparing circuit. In the logic-in memory of the above described document, all of the memory cells determine the collation. Thus, the logic-in memory is referred to as a full-associative memory. The full-associative memory includes a memory cell array having a plurality of memory cells arranged in a matrix of rows and columns. In the full-associative memory, all of the memory cells have a function for determining the collation, so that retrieval along a word direction (row direction) in the memory cell array and retrieval along a bit direction (column direction) therein are performed based on an input of a keyword. More specifically, a complete determination of the collation along the word direction and the bit direction is made.

In the full-associative memory, a complete determination of the collation can be made while the area of a unit memory cell is increased. Therefore, the area of the full-associative memory illustrated in the above described document is increased by approximately six times the area of a general-purpose dynamic memory having the same storage capacity as the area of the full-associative memory.

Additionally, if and when a complete determination of the collation is not required, that is, when a partial determination of the collation or a determination of the collation depending on the condition is made, it becomes redundant to have comparing logical circuits for a determination of the collation, respectively, in all of the memory cells. Therefore, it is not economical to use a full-associative memory, in a semiconductor device.

SUMMARY OF THE INVENTION

An object of the present invention is to provide a semiconductor memory device having an associative function in which the integration density is increased.

Another object of the present invention is provide an associative, memory device comprising a plurality of memory cells where each cell does not have a function for determining the collation.

Still another object of the present invention is to provide a semiconductor memory device capable of making partial a determination of the collation or a determination of the collation depending on the condition.

Still another object of the present invention is to provide an associative memory device that is accessible at high speeds.

A further object of the present invention is to provide an associative memory device in which pipeline processing can be performed.

A still further object of the present invention is to provide an associative memory device which can be used for an operand data pair producing mechanism in a data flow type information processor.

In order to attain the above described objects, the semiconductor memory device according to the embodiments of the present invention comprises data inputting means, storing means, reading means, comparing means, data outputting means and writing means. The data inputting means receives data comprising first information and second information. The storing means comprises a plurality of memory cells for storing a plurality of data of the second information. The reading means is responsive to the first information applied from the data inputting means for reading out any of the plurality of data from the storing means. The comparing means compares the second information applied from the data inputting means with the second information included in the data read out from the, storing means, to determine whether or not the information coincides with each other. The data outputting the means is responsive to an output indicating coincidence applied from the comparing means for outputting the data read out from the storing means. The writing means is responsive to an output indicating incoincidence applied from the comparing means for writing the data of the second information which is applied from the data inputting means, into the storing means.

In the semiconductor memory device according to the present invention, data is read out from the storing means based on the first information included in the data inputted by the data inputting means. The second information included in the inputted data is compared with the second information included in the data read out from the storing means. When the information coincides with each other, the data read out from the storing means is outputted. On the other hand, when the information does not coincide with each other, the inputted data is written into the storing means.

The semiconductor memory device according to the embodiments of the present invention is provided with comparing means other than the storing means. Therefore, processing can be selected corresponding to the condition of the determination. In addition, since the storing means does not have a function for determining the collation, integration of the semiconductor device is significantly improved.

In the semiconductor memory device for the embodiments of the present invention, an accessing operation to the storing means and a comparing operation in the comparing means can be processed in a pipeline manner. Thus, access can be made at high speeds as in an associative memory device.

As described above there can be provided a semiconductor memory device having an associative function in which high integration density with high speeds can be achieved and costs can be significantly reduced in the embodiments of the present invention.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

Description of the Preferred Embodiments

Referring now to the figures, one embodiment of the present invention will be described in detail.

A description is made for a semiconductor memory device according to one embodiment of the present invention which is employed as a paired data detecting portion in a data flow type information processor.

The data flow type information processor is one type of a non-von Newmann computer having no concept of sequential execution of instructions by a program counter. Such a data flow type information processor employs architecture based on parallel processing of instructions. In the data flow type information processor, immediately after data which are objects of an operation are collected, the instructions can be executed and a plurality of instructions may be simultaneously driven by the data, so that programs are executed in parallel in accordance with the natural flow of the data. As a result, the required time for the operation is significantly reduced.

Figure 1:
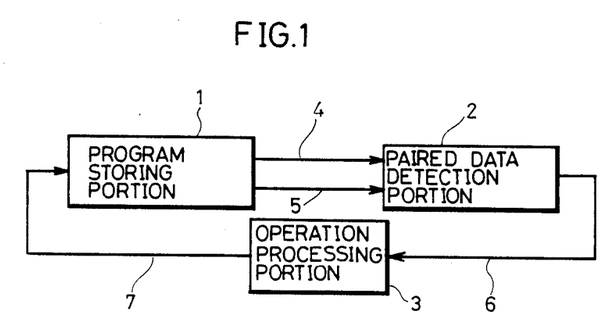
FIG. 1 is a block diagram illustrating a structure of a data flow type information process or in which a semiconductor memory device is employed, according to one embodiment of the present invention.
Figure 2:
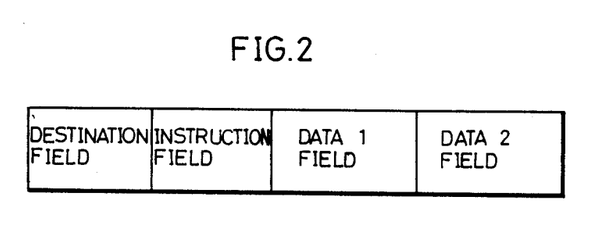
FIG. 2 is a diagram illustrating a field structure of a data packet processed by the information processor in FIG. 1.

FIG. 1 is a block diagram illustrating an embodiment for a structure of a data flow type information processor, and FIG. 2 is a diagram illustrating an embodiment for a field structure of a data packet processed in the information processor in FIG. 1.

Destination information is stored in a destination field in a data packet illustrated in FIG. 2, instruction information is stored in an instruction field therein, and operand data is stored in a data 1 field or a data 2 field therein.

Figure 3:
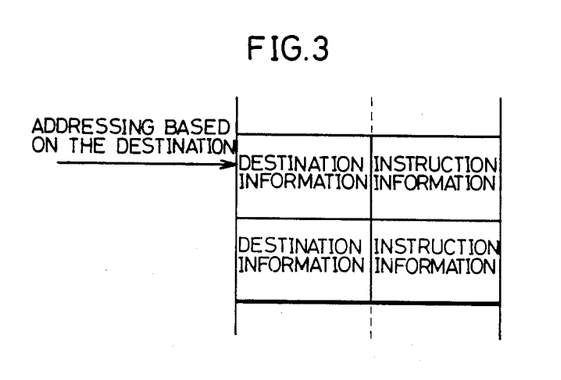
FIG. 3 is a diagram illustrating a part of a data flow program stored in a program storing portion in the information processor in FIG. 1.

The information processor illustrated in FIG. 1 includes a program storing portion 1, a paired data detecting portion 2, and an operation processing portion 3. A data flow program illustrated in FIG. 3 is stored in the program storing portion 1. The program storing portion 1 reads out the destination information and the instruction information from the data flow program as illustrated in FIG. 3 by addressing based on the content of the destination field (destination information) in the inputted data packet, stores the information in the destination field and the instruction field in the data packet, and outputs the data packet. The paired data detecting portion 2 queues the data packet outputted from the program storing portion 1. More specifically, the paired data detecting portion 2 detects two different data packets having the same destination information, stores operand data in a data 1, field for one of the two data packets and in a data 2 field for the other data packet, and outputs the other data packet.

The operation processing portion 3 performs operation processing based on the instruction information with respect to the data packet outputted from the paired data detecting portion 2, stores the result of the processing in the data 1 field for the data packet, and outputs the same to the above described program storing portion 1.

The program storing portion 1 and the paired data detecting portion 2 are coupled to each other by data transmission paths 4 and 5, and the paired data detecting portion 2 and the operation processing portion 3 are coupled to each other by a data transmission path 6. In addition, the operation processing portion 3 and the program storing portion 1 are coupled to each other by a data transmission path 7.

The data packet circulates through the program storing portion 1, the paired data detecting portion 2 and the operation processing portion 3 in that order. Thereby processing progresses based on the data flow program stored in the program storing portion 1.

Figure 4:
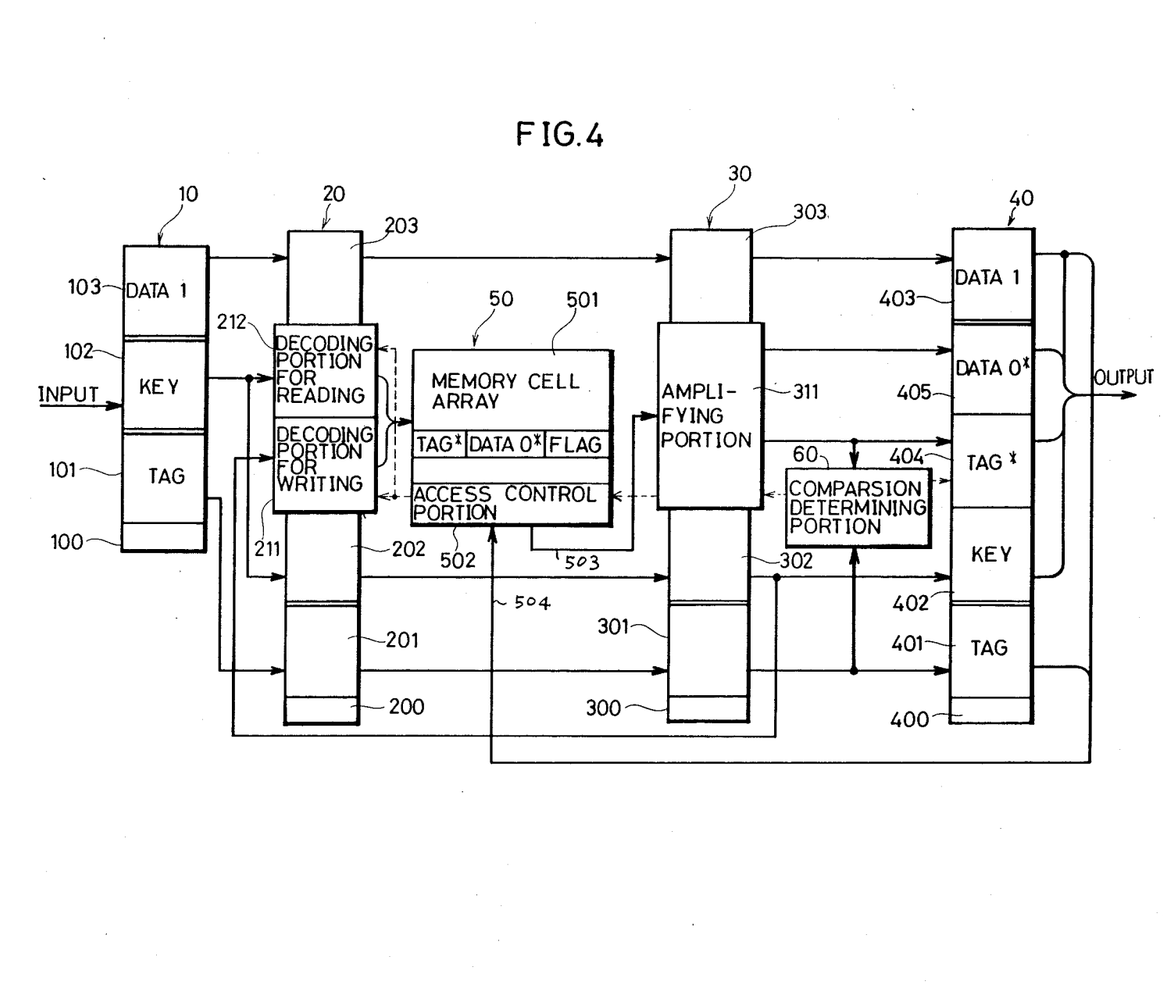
FIG. 4 is a block diagram illustrating the entire structure of a semiconductor memory device according to another embodiment of the present invention.

FIG. 4 is a block diagram illustrating the entire structure of a semiconductor memory device according to an embodiment of the present invention. This semiconductor memory device is employed as the paired data detecting portion 2 in the data flow type information processor in FIG. 1.

The semiconductor memory device illustrated in FIG. 1 includes a first data transferring portion 10, a second data transferring portion 20, a third data transferring portion 30, a fourth data transferring portion 40, a storing portion 50 and a comparison determining portion 60. The first data transferring portion 10 includes a transfer control circuit 100 and data holding circuits 101 to 103. Tag information is inputted to the data holding circuit 101, key information is inputted to the data holding circuit 102, and data 1 is inputted to the data holding circuits 103. The tag information corresponds to the instruction information stored in the instruction field in the data packet illustrated in FIG. 2, and the key information corresponds to the destination information stored in the destination field in the data packet. In addition, the data 1 corresponds to the operand data stored in the data 1 field in the data packet.

The second data transferring portion 20 includes a transfer control circuit 200, data holding circuits 201 to 203, a decoding portion 211 for writing, and a decoding portion 212 for reading. The tag information is transferred to the data holding circuit 201 from the data holding circuit 101. The key information is transferred to the data holding circuit 202 and the decoding portion 212 for reading from the data holding circuit 102. The data 1 is transferred to the data holding circuit 203 from the data holding circuit 103. Furthermore, the key information is transferred to the decoding portion 211 for writing from a data holding circuit 302 as described below. The decoding portion 211 for writing and the decoding portion 212 for reading are data holding circuits and each have a decoding function, which may include a combination of a conventional decoder or a decoder having a increment function and a data latching circuit for example. The decoding portion 211 for writing and the decoding portion 212 for reading each include a row decoder for selecting a row in a memory cell array 501 as described below and a column decoder for selecting columns.

A storing portion 50 includes the memory cell array 501 having a plurality of memory cells arranged in a plurality of rows and columns and an access control portion 502. Each of the memory cells corresponds to a linear address. The storing portion 50 includes a dynamic random access memory (DRAM), a static random access memory (SRAM) or the like. In the memory cell array 501, a plurality of word lines and a plurality of bit lines are arranged to intersect with each other, with each of the memory cells being respectively provided at intersections thereof. The memory cell array 501 stores a plurality of data sets each including tag information, data 0 and flag information. The flag information indicates whether or not the corresponding tag information and data 0 are effective.

At the time of data reading, any of the word lines (rows) and any of the bit lines (columns) in the memory cell array 501 are selected by the decoding portion 212 for reading. Data is read out to a read data line 503 from the memory cells respectively, which are provided at intersections thereof, through the access control portion 502.

On the other hand, at the time of data writing, any of the word lines (rows) and any of the bit lines (columns) in the memory cell array 501 are selected by the decoding portion 211 for writing. Data is written to the memory cells respectively provided at intersections thereof from a write data line 504 through the access control portion 502. The access control portion 502 connects the bit lines selected by the decoding portion 212 for reading to the read data line 503 at the time of data reading while connecting the bit lines selected by the decoding portion 211 for writing to the write data line 504 at the time of data writing. The access control portion 502 includes a plurality of transfer gates. Meanwhile, the access control portion 502 is generally set to a data read state.

The third data transferring portion 30 includes a transfer control circuit 300, data holding circuits 301 to 303, and an amplifying portion 311. The tag information is transferred to the data holding circuit 301 from the data holding circuit 201. The key information is transferred to the data holding circuit 302 from the data holding circuit 202. The data 1 is transferred to the data holding circuit 303 from the data holding circuit 203. A data set read out to the read data line 503 from the memory cell array 501 is applied to the amplifying portion 311. Because data read out from the memory cell array 501 is outputted at an analogue level through the access control portion 502, the signal at the analogue level is converted into a signal at a digital level by the amplifying portion 311, to be held therein. The amplifying portion 311 is a data holding circuit having an amplifying function. A sense amplifier circuit with a conventional data latch is employed as the amplifying portion 311.

Tag information in the data set amplified by the amplifying portion 311 and the tag information held in the data holding circuit 301 are applied to the comparison determining portion 60. The comparison determining portion 60 is a circuit for determining coincidence, collation and size for two input data. The comparison determining portion 60 outputs a control signal based on the result of the determination, and applies the control signal to the fourth data transferring portion 40, the amplifying portion 311, the access control portion 502, the decoding portion 212 for reading, and the decoding portion 211 for writing.

The fourth data transferring portion 40 includes a transfer control circuit 400 and data holding circuits 401 to 405. The tag information is transferred to the data holding circuit 401 from the data holding circuit 301. The key information is transferred to the data holding circuit 402 from the data holding circuit 302. The tag information in the data set amplified by the amplifying portion 311 is transferred to the data holding circuit 404. Data 0 in the data set amplified by the amplifying portion 311 is transferred to the data holding circuit 405. Data 1 is transferred to the data holding circuit 403 from the data holding circuit 303.

When the comparison determining portion 60 determines that the inputted two tag information coincide with each other, the key information, the tag information, the data 0 and the data 1 respectively held in the data holding circuits 402, 404, 405 and 403 are outputted. On the other hand, when the comparison determining portion 60 determines that the inputted two tag information do not coincide with each other, the tag information and the data 1 respectively held in the data holding circuits 401 and 403 are transferred to the access control portion 502 and the key information, the tag information and the data 0 respectively held in the data holding circuits 402, 404 and 405 are outputted, or the tag information and the data 1 respectively held in the data holding circuits 401 and 403 are transferred to the access control, portion 502. In addition, on the basis of the result of the determination by the comparison determining portion 60, it is determined whether or not flag information corresponding to the data set read out through the access control portion 502 is updated. The result of the determination is rewritten to a corresponding memory cell in the memory cell array 501 through the access control portion 502.

Data transfer from the first data transferring portion 10 to the second data transferring portion 20, data transfer from the second data transferring portion 20 to the third data transferring portion 30, data transfer from the third data transferring portion 30 to the fourth data transferring portion 40, and a selective output of data from the fourth data transferring potion 40 are controlled by the transfer control circuits 100, 200, 300 and 400, respectively. Each of the data holding circuits 101 to 103, 201 to 203 and 301 to 303 includes a D-type flip-flop responsive to an edge of, for example, a clock pulse for outputting data as held. In addition, each of the data holding circuits 401 to 405 includes a D-type flip-flop with an output enable terminal. The transfer control circuits 100, 200, 300 and 400 perform a clock synchronization type transfer control or handshaking type transfer control. According to the clock synchronization type transfer control, each of the data holding circuits transfers the held data to the data holding circuit in the next stage in synchronization with a clock signal. According to the handshaking type transfer control, a transmission signal and a transmission authorizing signal are sent and received between each of the data holding circuit and the data holding circuit in the next stage. More specifically, if and when each of the data holding circuits applies the transmission signal to the data holding circuits in the next stage and receives the transmission authorizing signal from the data holding circuits in the next stage, a data transfer is made from each of the data holding circuits to the data holding circuits in the next stage.

Figure 5:
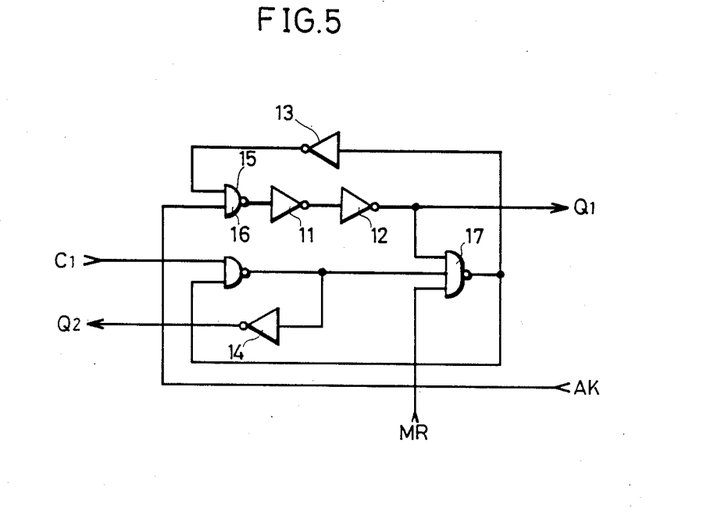
FIG. 5 is a diagram illustrating an embodiment of a logic circuit having a transfer control circuit for the semiconductor memory device shown in FIG. 4.

When the clock synchronization type transfer control is performed, a buffer driver responsive to the clock pulse for transferring signals is employed for each of the transfer control circuits 100 to 400. On the other hand, when the handshaking type transfer control is performed, a logical circuit as illustrated in, for example, FIG. 5 is employed for each of the transfer control circuits 100 to 400. The logical circuit illustrated in FIG. 5 is a 2 input and 2 output logical circuit including inverters 11 to 14 and NAND gates 15 to 17. The NAND gate 16 has one input terminal receiving a transmission input signal C1. The NAND gate 15 has one input terminal receiving a transmission authorizing input signal AK. A transmission authorizing output signal Q2 is outputted from the inverter 14. The inverters 11 and 12 constitute a buffer driver. A transmission output signal Q1 is outputted from the buffer driver.

The transmission output signal Q1 from the transfer control circuit 100 becomes the transmission input signal C1 to the transfer control circuit 200, and the transmission authorizing output signal Q2 from the transfer control circuit 200 becomes the transmission authorizing input signal AK to the transfer control circuit 100. In addition, the transmission output signal Q1 from the transfer control circuit 200 becomes the transmission input signal C1 to the transfer control circuit 300, and the transmission authorizing output signal Q2 from the transfer control circuit 300 becomes the transmission authorizing input signal AK to the transfer control circuit 200. The relation between the transfer control circuit 300 and the transfer control circuit 400 in the same relation as described above. The transmission input signal C1 is applied to the transfer control circuit 100 from the program storing portion 1 illustrated in FIG. 1, and the transmission authorizing output signal Q2 is applied to the program storing portion 1 from the transfer control circuit 100. In addition, the transmission output signal Q1 is applied to the operation processing portion 3 illustrated in FIG. 1 from the transfer control circuit 400, and the transmission authorizing input signal AK is applied to the transfer control circuit 400 from the operation processing portion 3. In the above described manner, the transfer control circuits 100 to 400 perform a self-synchronization type transfer control by sending and receiving the transmission signal and the transmission authorizing signal. The transmission output signal Q1 of each of the transfer control circuits 100 to 400 becomes a clock input for D-type flip-flop constituting the corresponding data holding circuit.

A description is now provide for the process flow in the semiconductor memory device illustrated in FIG. 4.

Three types of data, i.e., tag information, key information and operand data (data 1) are inputted to the first data transfer portion 10, which are held in the data holding circuits 101, 102 and 103, respectively. Each of the inputted data is sequentially transferred to the second data transferring portion 20, the third data. transferring portion 30 and the fourth data transferring portion 40. The tag information is sequentially transferred to the data holding circuit 201, the data holding circuit 301 and the data holding circuit 401. The key information is transferred to the data holding circuit 202, as well as to the decoding portion 212 for reading out the data set from the storing portion 50. The key information transferred to the data holding circuit 202 is sequentially transferred to the data holding circuit 302 and the data holding circuit 402. The data 1 is sequentially transferred to the data holding circuit 203 the data holding circuit 303 and the data holding circuit 403.

The decoding portion 212 for reading decodes the key information, to address the memory cell array 501. Access is made to an address specified by the decoding portion 212 for reading, so that a data set including new tag information, new operand data and flag information from a memory cell corresponding to the address. When the tag information and the data 0 are effective, the flag information is set to "1".

The tag information in the data set outputted from the amplifying portion 311 is transferred to the comparison determining portion 60 and the data holding circuit 404 in the fourth data transferring portion 40. In addition, the data 0 in the data set outputted from the amplifying portion 311 is transferred to the data holding circuit 405 in the fourth data transferring portion 40. Furthermore, the tag information held in the data holding circuit 301 in the third data transferring portion 30 is applied to the comparison determining portion 60.

The comparison determining portion 60 compares new tag information applied from the amplifying portion 311 with the inputted tag information applied from the data holding circuit 301. When the tag information and inputted tag information coincide with each other, the comparison determining portion 60 applies a coincidence signal to the transfer control circuit 400 in the data transferring portion 40, the amplifying portion 311, the access control portion 501, the decoding portion 212 for reading and the decoding portion 211 for writing. The transfer control portion 400 is responsive to the coincidence signal for controlling the data holding circuits 402, 404, 405 and 403 such that the inputted key information, the new tag information, a new data 0, and the inputted data 1 respectively held therein are outputted to the exterior. Furthermore, the comparison determining portion 60 controls the access control portion 502 and the decoding portion 211 for writing such that the flag information stored in the address accessed by the decoding portion 212 for reading is reset to "0".

On the other hand, when the new tag information and the inputted tag information do not coincide with each other, a comparison determining portion 60 applies an incoincidence signal to the transfer control circuit 400 in the fourth data transferring portion 40, the amplifying portion 311, the access control portion 502, the decoding portion 212 for reading and the decoding portion 211 for writing. The transfer control circuit 400 is responsive to the incoincidence signal for controlling the data holding circuits 401 and 403 such that the inputted; tag information and the inputted data 1, which are respectively held, are transferred to the access control portion 502. The access control portion 502 is reset to a data write state in response to the incoincidence signal. In addition, the amplifying portion 311 is rendered inactive in response to the incoincidence signal. The decoding portion 212 for reading is rendered inactive in response to the incoincidence signal. The decoding portion 211 for writing is rendered active in response to the incoincidence signal.

In addition, the key information held by the data holding circuit 302 in the third data transferring portion 30 is transferred to the decoding portion 211 for writing. The decoding portion 211 for writing decodes the key information, to address the memory cell array 501.

Therefore, the inputted tag information and the inputted data 1, which are respectively held in the data holding circuits 401 and 403, are written to the address from which the data set is read out by the decoding portion 212 for reading. On this occasion, the inputted key information, the new tag information and the new operand data (data 0), which are respectively held in the data holding circuits 402, 404 and 405 in the fourth data transferring portion 40, are outputted to the exterior.

Meanwhile, the flag information in the data set read out from the memory cell array 501, together with the new tag information, are applied to the comparison determining portion 60 through the amplifying portion 311. When the flag information is set to "1", effective tag information and operand data are stored in the accessed address. A star in FIG. 4 indicates that the tag information or the operand data is effected. When the flag information is reset to "0", effective tag information and operand data are not stored in the accessed address.

When effective tag information and operand data are not stored in the accessed address, the comparison determining portion 60 applies a corresponding control signal to the transfer control circuit 400 in the fourth data transferring portion 40. The transfer control circuit 400 controls the data holding circuits 401 to 405 such that the inputted tag information and the inputted operand data (data 1) are only written to the storing portion 50 while no data is outputted from the fourth data transferring portion 40.

As described in the foregoing, when the tag information in the inputted data packet and the tag information in the data set read out from the memory cell array 501 coincide with each other, a data packet is outputted which includes the inputted key information, the tag information, the new operand data (data 0) and the inputted operand data (data 1). In this case, the flag information corresponding to the accessed address is reset to "0", so that tag information and operand data (data 1) in a data packet subsequently inputted can be stored in the accessed address.

On the other hand, when the tag information in the inputted data packet and the tag information read out from the memory cell array 501 coincide with each other, the same data packet as the inputted data packet is outputted. Thereby the tag information and the operand data (data 1) in the inputted data packet are written to the accessed address.

Figure 6:
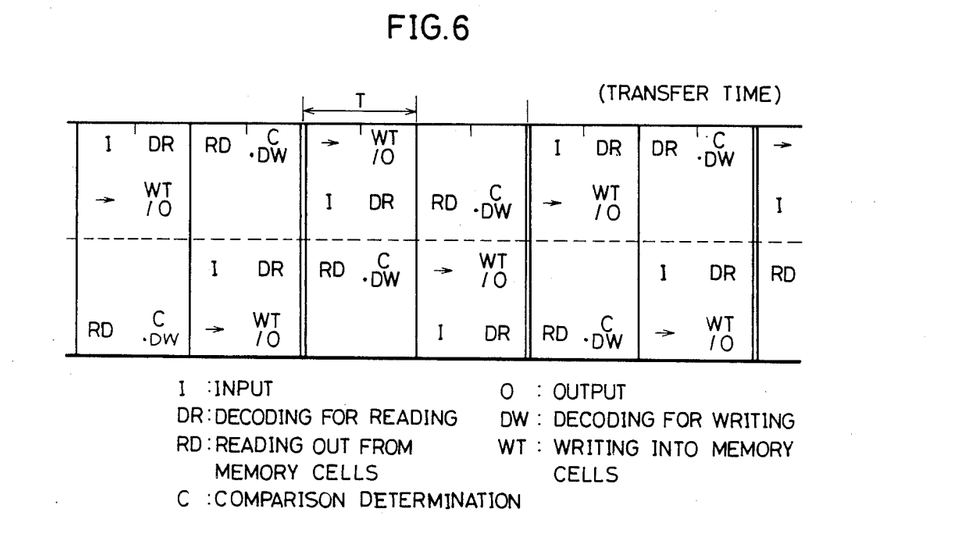
FIG. 6 is a diagram which illustrates a pipeline parallel processing operation performed in the semiconductor memory device in FIG. 4.

FIG. 6 is a diagram for explaining a pipeline processing operation performed in the semiconductor memory device illustrated in FIG. 4 when data are inputted at time intervals equal to the inherent transfer time of the first to fourth data transferring portions 10 to 40.

In FIG. 6, I denotes an input of data to the first data transferring portion 10, and DR denotes the addressing of the memory cell array 501 by the decoding portion 212 for reading. RD denotes the reading, of data from the storing portion 50, and C denotes the determination of a comparison by the comparison determining portion 60. O denotes the output of data from the data transferring portion 40, DW denotes the addressing of the memory cell array 501 by the decoding portion 201 for writing, and WT denotes the writing of data to the storing portion 50.

As illustrated in FIG. 6, the reading RD of data from the storing portion 50 and the input I of data to the first data transferring portion 10 are multiplexed. In addition, the writing WT of data to the storing portion 50 or the output O of data from the fourth data transferring portion 40, the addressing DR of the memory cell array 501 by the decoding portion 212 for reading, the addressing MGW of the memory cell array 501 by the decoding portion 211 for writing, and the determination C of the comparison by the comparison determining portion 60 are multiplexed. In the above described manner, pipeline parallel processing is achieved.

Although in the above described embodiment, a description was made for an example in which the semiconductor memory device according to the present invention is used as a paired data detecting portion in the data flow type information processor, the semiconductor memory device according to the present invention can be used for other applications. For example, the semiconductor memory device can be used for an associative memory device for making a table search or the like at high speeds.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device, comprising:
   data inputting means for receiving data, said data including first information and second information;
   storing means for storing said data of said second information, said storing means including a plurality of memory cells;
   reading means for reading out said second information from said storing means in response to said first information received by said data inputting means;
   comparing means for comparing said second information received by said data inputting means with said second information read out from said storing means and determining whether or not said second information received by said data inputting means coincides with said second information read out from said storing means;
   data outputting means for outputting said second information read out from said storing means in response to a coincidence output from said comparing means which indicates that said second information received by said data inputting means coincides with said second information read out from said storing means; and
   writing means for writing said second information received by said data inputting means into said storing means in response to an incoincidence output from said comparing means which indicates that said second information received by said data inputting means fails to coincide with said second information from said storing means.

2. The semiconductor memory device according to claim 1, wherein
   said data received by said data inputting means further includes third information corresponding to said second information,
   said data stored in said storing means further includes said third information corresponding to said second information stored therein,
   said data outputting means outputs said third information received by said data inputting means in response to said coincidence output from said comparing means, and said writing means writes said third information received by said data inputting means in response to said incoincidence output from said comparing means.

3. The semiconductor memory device according to claim 1, wherein
said data outputting means outputs said second information read out from said storing means in response to said incoincidence output from said comparing means.

4. The semiconductor memory device according to claim 2, wherein
said data outputting means outputs said second and third information read out from said storing means in response to said incoincidence output from said comparing means.

5. The semiconductor memory device according to claim 2, wherein
said data inputting means comprises,
first holding means for holding said first information,
second holding means for holding said second information, and
third holding means for holding said third information,
said storing means comprises a memory cell array of said plurality of memory cells,
said reading means comprises first decoding means for selecting one of said plurality of memory cells in said memory cell array in response to said first information from said first holding means,
said data outputting means comprises,
fourth holding means for holding said first information from said first holding means,
fifth holding means for holding said second information from said second holding means,
sixth holding means for holding said third information from said third holding means,
seventh holding means for holding said second information read out from said storing means,
eighth holding means for holding said third information read out from said storing means, and
transfer control means for controlling said fourth, sixth, seventh and eighth holding means and respectively outputting the information held therein in response to said incoincidence output from said comparing means,
said writing means comprises
write decoding means for selecting one of said plurality of memory cells in said memory cell array in response to said incoincidence output from said comparing means and said first information from said first holding means, and
write control means for writing the information held in said fifth and sixth holding means into each of said plurality of memory cells selected by said write decoding means.

6. The semiconductor memory device according to claim 5, wherein
said first control means controls said fourth, sixth and eighth holding means in response to said incoincidence output from said comparing means and respectively outputting the information held therein.

7. The semiconductor memory device according to claim 4, wherein
said storing means stores fourth information corresponding to said data, said fourth information being indicative of whether or not said data corresponding thereto is effective, and
said data outputting means is prevented from providing an output when said fourth information corresponding to said data read out from said storing means indicates that said data fails to be effective.

8. A semiconductor memory device, comprising:
first data transferring means including,
first data holding means for holding first information externally applied,
second data holding means for holding second information externally applied, and
third data holding means for holding third information externally applied;
a memory cell array having a plurality of memory cells for storing a plurality of data sets of said second information, said third information corresponding to said second information, and fourth information indicative of whether said third information is effective or ineffective;
second data transferring means including,
fourth data holding means for holding said first information from said first data transferring means,
fifth data holding means for holding second information from said second data holding means,
sixth data holding means for holding said third information from said third data holding means,
read decoding means for decoding said first information from said first data holding means to select one of said plurality of memory cells in said memory cell array, and
write decoding means;
access control means for reading out the data set corresponding to said memory cells selected by said read decoding means;
third data transferring means including,
seventh data holding means for holding said first information from said fourth data holding means,
eighth data holding means for holding said second information from said fifth data transferring means,
ninth data holding means for holding said third information from said sixth data transferring means, and
amplifying means for amplifying and holding the data set read out from said memory cell array;
fourth data transferring means including,
tenth data holding means for holding said first information from said seventh data transferring means,
eleventh data holding means for holding said second information from said eighth data holding means,
twelfth data holding means for holding said third information from said ninth data holding means,
thirteenth data holding means for holding said second information of said data set from said amplifying means, and
fourteenth data holding means for holding said third information of said data set from said amplifying means;
comparing means for comparing said second information of said data set from said amplifying means with said second information from said eighth data holding means and determining whether or not said second information of said data set from said amplifying means coincides with said second information from said eighth data holding means;

first transfer control means for controlling the transfer of information from said first data transferring means to said second data transferring means;
second transfer control means for controlling the transfer of information from said second data transferring means to said third data transferring means;
third transfer control means for controlling the transfer of information from said third data transferring means to said fourth data transferring means; and
fourth transfer control means for outputting the information held in said tenth, twelfth, thirteenth and fourteenth data holding means, in response to a coincidence output from said comparing means when said second information of said data set from said amplifying means coincides with said second information from said eighth data holding means, and outputting the information held in said tenth, thirteenth and fourteenth data holding means, in response to an incoincidence output from said comparing means when said second information of said data set from said amplifying means fails to coincide with said second information from said eighth data holding means;
said write decoding means decoding said first information held in said seventh data holding means and selecting one of said plurality of memory cells in said memory cell array, in response to said incoincidence output from said comparing means;
said access control means writing the information held in said eleventh and twelfth data holding means into the memory cells selected by said write decoding means in response to said incoincidence output from said comparing means.

9. The semiconductor memory device according to claim 8, wherein
said first, second, third and fourth transfer control means perform handshaking control.

10. An information processor for processing data packets, each of the data packets having a destination field for storing destination information, an instruction field for storing instruction information, and first and second data fields for storing data in accordance with a data flow program, comprising:
program storing means for storing the data flow program which includes a plurality of the destination information and a plurality of the instruction information corresponding thereto, said program storing means reading out the destination information and the instruction information from said data flow program addressed by the destination information in the destination field in the inputted data packet, storing the destination information and the instruction information in the destination field and the instruction field in the data packet, respectively, and outputting the data packet;
paired data producing means for queuing the data packet outputted from said program storing means, said paired data producing means detecting two data packets having the same destination information in the data packets outputted from said program storing means, storing data in a first data field in one of the data packets and in a second data field in the other data packet and outputting the other data packet, said paired data producing means including,
data inputting means for receiving the data packet,
storing means having a plurality of memory cells for storing a plurality of the data packets,
reading means for reading out one of said plurality of the data packets from said storing means in response to the destination information in the data packet from said data inputting means;
comparing means for comparing the instruction information in the data packet from said data inputting means with the instruction information in the data packet read out from said storing means and determining whether or not the instruction information in the data packet from said data inputting means coincides with the instruction information in the data packet read out from said storing means;
data outputting means for outputting data in the data packet from said data inputting means, the destination information, the instruction information and the data in the data packet read out from said storing means in response to a coincidence output indicating that the instruction information in the data packet from said data inputting means coincides with the instruction information in the data packet read out from said storing means; and
writing means for writing the data packet from said data inputting means into said storing means in response to an incoincidence output indicating that the instruction information in the data packet from said data inputting means fails to coincide with the instruction information in the data packet read out from said storing means.

11. The information processor according to claim 10, wherein
said data outputting means in said paired data producing means outputs the destination information applied in the data packet applied from said data inputting means, the instruction information and the data in the data packet read out from said storing means.

12. A method for processing data packets in an information processor, each of the data packets having a destination field for storing destination information, an instruction field for storing instruction information, and first and second data fields for storing data according to a data flow program, comprising the steps of:
(a) storing the data flow program which includes a plurality of the destination information and a plurality of the instruction information corresponding thereto;
(b) reading out the destination information and the instruction information from said data flow program addressed by the destination information in the destination field of the data packet;
(c) storing the destination information and the instruction information in the destination field and the instruction field in the data packet respectively in program storing means;
(d) outputting the data packet from said program storing means;
(e) queuing the data packet outputted from said program storing means;
(f) detecting two data packets having the same destination information in the data packets outputted from said program storing means by paired data producing means;
(g) storing data in a first data field in one of the data packets and in a second data field in the other data packet;

(h) outputting the other data packet from said paired data producing means;
(i) receiving the data packet by data inputting means;
(j) storing the data packets in storing means having a plurality of the data packets;
(k) reading out one of said plurality of the data packets from said storing means in response to the destination information in the data packet from said data inputting means;
(l) comparing the instruction information in the data packet from said data inputting means with the instruction information in the data packet read out from said storing means;
(m) determining whether or not the instruction information in the data packet from said data inputting means coincides with the instruction information in the data packet read out from said storing means;
(n) outputting data in the data packet from said data inputting means, the destination information, the instruction information and the data in the data packet read out from said storing means in response to a coincidence output indicating that the instruction information from said data inputting means coincides with the instruction information in the data packet read out from said storing means; and
(o) writing the data packet from said data inputting means into said storing means in response to an incoincidence output indicating that the instruction information in the data packet from said data inputting means fails to coincide with the instruction information in the data packet read out from said storing means.

13. A method for retrieving information in a semiconductor device, comprising the steps of:
(a) holding first, second and third information from an externally applied source;
(b) storing a plurality of data sets of said second information in a plurality of memory cells, said third information corresponding to said second information and fourth information indicative of whether said third information is effective or ineffective;
(c) holding said first, second and third information from said step (a);
(d) decoding said first information from said step (a);
(e) selecting one of said plurality of memory cells corresponding to said step (d);
(f) reading out the data set corresponding to each of said memory cells selected at said step (e);
(g) holding said first, second and third information from said step (c);
(h) amplifying and holding the data set read out from said plurality of memory cells;
(i) holding said first, second and third information from said steps (g) and (h);
(j) comparing said second information of said data set from said step (h) with said second information from said step (g);
(k) determining whether or not said second information from said step (h) coincides with said second information from said step (g);
(l) controlling the transfer of information at said steps (a), (c) and (g) in response to a coincidence output from said step (j);
(m) outputting the information from said step (i) in response to said incoincidence output when said second information of said data set from said step (h) fails to coincide with said second information from said step (g);
(n) decoding said first information from said step (g);
(o) selecting one of said plurality of memory cells in response to said incoincidence output; and
(p) writing the information of said step (i) into said memory cells selected at said step (o) in response to said incoincidence output.

14. A method for retrieving information in a semiconductor device, comprising the steps of:
(a) retrieving data having first and second information;
(b) storing said data having said second information in a plurality of memory cells;
(c) reading out said data having said second information from said step (b) in response to said data having said first information received at step (a);
(d) comparing said data having said second information received at said step (a) with said data having said first information read out at said step (c);
(e) determining whether or not said data having said second information at said step (a) coincides with said data having said second information at said step (b);
(f) outputting said data having said second information from said step (b) in response to a coincidence output indicating that said data having said second information at said step (a) coincides with said data having said second information at said step (b); and
(g) writing said data having said second information from said step (a) into said plurality of memory cells in response to an incoincidence output indicating that said data having said second information at said step (a) fails to coincide with said data having said second information at said step (b).

15. A method according to claim 14, wherein
said data of said step (a) further comprises third information corresponding to said second information,
said data stored at said step (b) further comprises said third information corresponding to said second information,
said data outputted at said step (f) further comprises said third information, and
said data written at said step (g) further comprises said third information.

* * * * *